US012608934B2

(12) United States Patent
Bandecchi et al.

(10) Patent No.: US 12,608,934 B2
(45) Date of Patent: Apr. 21, 2026

(54) SYSTEM AND METHOD FOR ESTIMATING DYNAMIC SOIL PARAMETERS BASED ON MULTISPECTRAL OR HYPERSPECTRAL IMAGE

(71) Applicant: SMARTCLOUDFARMING GMBH, Berlin (DE)

(72) Inventors: Michele Bandecchi, Berlin (DE); Nenad Antonic, Sabac (RS); Marko Pavlovic, Novi Sad (RS); Gavrilo Bosakov, Novi Sad (RS); Dubravko Culibrk, Novi Sad (RS)

(73) Assignee: SMARTCLOUDFARMING GMBH, Berlin (DE)

( * ) Notice: Subject to any disclaimer, the term of this patent is extended or adjusted under 35 U.S.C. 154(b) by 185 days.

(21) Appl. No.: 18/555,171

(22) PCT Filed: Apr. 21, 2022

(86) PCT No.: PCT/EP2022/060532
§ 371 (c)(1),
(2) Date: Oct. 12, 2023

(87) PCT Pub. No.: WO2022/223681
PCT Pub. Date: Oct. 27, 2022

(65) Prior Publication Data
US 2024/0290090 A1      Aug. 29, 2024

(30) Foreign Application Priority Data

Apr. 22, 2021     (RS) .................................. P2021/0504

(51) Int. Cl.
*G06V 20/10* (2022.01)
*G06V 10/82* (2022.01)
*G06V 20/13* (2022.01)

(52) U.S. Cl.
CPC ............ *G06V 20/188* (2022.01); *G06V 10/82* (2022.01); *G06V 20/13* (2022.01); *G06V 20/194* (2022.01)

(58) Field of Classification Search
CPC .... G06V 20/188; G06V 20/194; G06V 10/82; G06V 20/13
See application file for complete search history.

(56) References Cited

U.S. PATENT DOCUMENTS

2024/0087311 A1 * 3/2024 Soldevilla-Martinez ...................
G06V 20/188

OTHER PUBLICATIONS

Sahebi Mahmod Reza et al, "Neural networks for the inversion of soil surface parameters from synthetic aperture radar satellite data", Canadian Journal of Civil Engineering—Revue Canadienne Degenie Civil.,vol. {0} 31, No. {0} 1, Jan. 1, 2004 (Jan. 1, 2004), p. 95-108, XP055946660 DOI:_10.1139/I03-079 ISSN:0315-1468.

(Continued)

*Primary Examiner* — David F Dunphy
(74) *Attorney, Agent, or Firm* — Michael J. Feigin, Esq.; Feigin and Fridman LLC

(57) ABSTRACT

The invention proposes a new system and method for estimating dynamic soil parameters based on multispectral or hyperspectral images. The system 105 has two-stage estimation architecture and a fully connected layer 108 that connects the two estimators. The system estimates dynamic parameters such as organic carbon in the soil based on multispectral or hyperspectral images 102 and also uses geocoordinates 100 and soil elevation 101 as inputs. Multispectral or hyperspectral images 102 are further processed in the pre-processing module 103 and the data 104 is transmitted to the training neural network 107 of the 1st degree estimation module 106. It further processes them in submodule 108 for the extraction of latent features, estimates the low-dynamic parameters of the soil and forwards (Continued)

them to the output. Also, the output data of submodule 108 is the input data of module 2 for the 2nd degree estimation which estimates the highly dynamic parameters. The low-dynamic parameters 112 are e.g. soil texture, and highly dynamic parameters 113 are e.g. the concentration of organic carbon in the soil. Submodule 108 connects said modules 106 and 110.

20 Claims, 4 Drawing Sheets

(56)               References Cited

OTHER PUBLICATIONS

Minhoni Renatfa Teixeira De Almeida et al, "Multitemporal satellite imagery analysis for soil organic carbon assessment in an agricultural farm in southeastern Brazil", Apr. 21, 2021 (Apr. 21, 2021), vol. {0} 784, XP086579779 DOI:_10.1016/J.SCITOTENV 2021. 147216 ISSN:0048-9697 [retrieved on Apr. 21, 2021].
Mostafa Emadi et al, "Predicting and Mapping of Soil Organic Carbon Using Machine Learning Algorithms in Northern Iran", arxiv.org, Cornell University Library, 201 Olin Library Cornell University Ithaca, NY 14853,Jul. 12, 2020 (Jul. 12, 2020), XP081726f716 DOI:_10.3390/RS12142234.

* cited by examiner

SYSTEM AND METHOD FOR ESTIMATING DYNAMIC SOIL PARAMETERS BASED ON MULTISPECTRAL OR HYPERSPECTRAL IMAGE

TECHNICAL FIELD

The invention relates to a system and method for detecting soil parameters, in particular organic matter such as carbon, based on multispectral or hyperspectral images for example taken by satellite cameras or cameras located on aircraft, whether unmanned or not. The invention covers the field of regenerative agriculture, forestry and ecosystems in general.

BACKGROUND ART

In state of the art are presented following scientific papers: "Prediction of Soil Organic Carbon based on Landsat 8 Monthly NDVI Data for the Jianghan Plain in Hubei Province, China", "Importance and strength of environmental controllers of soil organic carbon changes with scale", "Soil organic carbon and texture retrieving and mapping using proximal, airborne and Sentinel-2 spectral imaging", "Evaluating the capability of the Sentinel 2 data for soil organic carbon prediction in croplands", "Evaluation of the potential of the current and forthcoming multispectral and hyperspectral imagers to estimate soil texture and organic carbon" and "Using deep learning to predict soil properties from regional spectral data".

Also the following patent applications and patents belong to current state of the art: patent CN102495919B entitled "Extraction method for influence factors of carbon exchange of ecosystem and system", published on Jun. 13, 2013, patent application US20190050948A1 entitled "Machine learning in agricultural planting, growing, and harvesting contexts" published Feb. 14, 2019, U.S. Pat. No. 9,652, 840B1 entitled "System and method for remote nitrogen monitoring and prescription" published May 16, 2017, patent application CN106960216A entitled "A kind of recognition methods of agricultural machinery working equipment type and device" published Jul. 18, 2017 and patent application EP3614308A1 entitled "Joint deep learning for land cover and land use classification" published on Feb. 26, 2020.

SUMMARY

The invention described herein provides improvements and solutions to certain drawbacks and problems of the background art. The invention contributes to the solutions to image processing problems in regenerative agriculture. Regenerative agriculture is the part of agriculture relating to the management and impact of carbon, such as deposit of carbon in the soil, cooling of the atmosphere, soil fertility, maintenance of the diversity of ecosystems, maintenance of the cycle of matter circulation in nature, maintenance of climate stability, etc.

The invention also contributes to improved accuracy of image processing in for use in regenerative agriculture by introducing a new two-stage architecture of the system for estimating soil parameters. The two-stage system architecture described herein can be advantageously used for effectively combining a variety of modern machine learning methods and for using existing soil parameter data for training system estimators. This cannot be done with one stage architecture, because such a system necessarily relies on only one type of machine learning.

In solving the problem of efficient coupling at the level of two-stage system architecture between the first and second stage of estimation, the invention further introduces a new component, a module for reduction and extraction of latent features connecting a first stage estimator with a second stage estimator.

The proposed invention further solves the problem of efficiently combining historical data about land parameters with more recent data obtained e.g. from satellites. More recent multispectral data related to land may be inadequate to optimally train the system, and it will be useful to add older historical data, and vice versa older historic data do not contain a multispectral image data because the satellites were not launched then.

Historical data for land using past data collection methods do not change very much over time, however data collected by modern method like imagery from satellites or drones can be obtained almost real-time and can show significant variation.

The invention further solves the problem of combining all these data with a two-stage architecture and a fully connected new layer of a neural network, because this architecture (system) provides for a first estimation of low-dynamic data where time correlation is less important (e.g. soil texture and flood plains changes only on a scale of several decades, and but such data are static for most of the land) and provides secondly for estimation of highly dynamic data (such as soil moisture, nutrient content and organic carbon content), which changes significantly on a time scale from daily to annual, and for these highly dynamic parameters the images must be used related to the moment when the soil sample was taken and when the parameters of the values in the laboratory were determined.

The systems and methods provided for herein distinguish from the background art as it comprises two-stage architecture of the estimation system and more importantly comprise connecting the first stage estimator and the second stage estimator of the two-stage system architecture. The systems and methods provided for herein distinguish from the background art by featuring combination of historical data and remote imagery, such as satellite data, in order to detect appropriate soil output parameters.

Accordingly, in a first aspect disclosed herein is a system for estimating dynamic soil parameters, where said system comprises:

a) a pre-processing module 103 b) an estimation system 105 comprising i. a first stage estimator module (106) comprising a neural network (107), a reduction submodule (108), and a submodule (109); and ii. a second stage estimator module (110)

wherein the system is configured for (i) receiving input data (100), (101) and/or (102) from a database, (ii) pre-processing data (102) in the pre-processing module (103) to produce pre-processed data (104) and (iii) forwarding data (100), (101), and/or (102/104) to an estimation system (105), which processes the data (100),(101), and/or (102/104) and forwards them to an output, wherein a. the reduction submodule (108) is configured for extracting one or more latent features, b. the submodule (109) is configured for estimating one or more low-dynamic soil parameters (112), c. the neural network (107) is configured to be trained with data (104) received from the pre-processing module (103) and in the next to the last layer of the neural network (107)

d. the submodule (108) is configured for reducing the dimensionality of the neural network (107) and for extracting the one or more latent features and for passing these on to the submodule (109) and also passed on to the second stage module estimator (110), e. the submodule (109) is configured for estimating low-dynamic soil parameters (112), which are then forwarded to the output, f. the second stage module estimator (110) is configured to be trained with the latent features and input data (100, 101) and for estimating highly dynamic parameters (113) for forwarding the highly dynamic parameters (113) to the output, wherein said submodule (108) configured for reduction and extraction of latent features is a fully connected layer which connects the first stage estimator module (106) and the second stage estimator module (110).

In a further aspect disclosed herein is a system for estimating dynamic soil parameters, where system comprises: a pre-processing module 103, an estimation system 105 comprising: a first stage estimator module (106) comprising a neural network (107), a reduction submodule (108), and a submodule (109); and a second stage estimator module (110). Mentioned system is configured for receiving input data (100), (101) and/or (102) from a database, pre-processing data (102) in the pre-processing module (103) to produce pre-processed data (104) and forwarding data (100), (101), and/or (102/104) to an estimation system (105), which processes the data (100),(101), and/or (102/104) and forwards them to an output, wherein the reduction submodule (108) is configured for extracting one or more latent features, the submodule (109) is configured for estimating one or more low-dynamic soil parameters (112), the neural network (107) is configured to be trained with data (104) received from the pre-processing module (103) and in the next to the last layer of the neural network (107) the submodule (108) is configured for reducing the dimensionality of the neural network (107) and for extracting the one or more latent features and for passing these on to the submodule (109) and also passed on to the second stage module estimator (110), the submodule (109) is configured for estimating low-dynamic soil parameters (112), which are then forwarded to the output, the second stage module estimator (110) is configured to be trained with the latent features and input data (100, 101) and for estimating highly dynamic parameters (113) for forwarding the highly dynamic parameters (113) to the output, and said submodule (108) configured for reduction and extraction of latent features is a fully connected layer which connects the first stage estimator module (106) and the second stage estimator module (110).

In a further aspect disclosed herein is a method for estimating dynamic soil parameters, comprising training the system of claims 1 to 12 with geocoordinate data 100, terrain elevation data 101, and multispectral or hyperspectral image data 102/104 for one or more soils of known dynamic soil parameters and subsequently submitting geocoordinate data 100, terrain elevation data 101, and multispectral or hyperspectral image data 102/104 for a soil of unknown dynamic soil parameters to the system and allowing the system to estimate the dynamic soil parameters.

In a further aspect disclosed herein is a method for estimating dynamic soil parameters comprising (i) a phase 200 of loading input data, comprising a step 201 of loading multispectral or hyperspectral image 102/104 and a step 202 of loading geocoordinates 100 and terrain elevation 101, (ii) a phase 203 of pre-processing of multispectral or hyperspectral image (102), (iii) a soil parameter estimation phase 204, and finally (iv) soil output data acquisition phases 210 and 212, wherein the estimation phase (204) comprise (iiia) a first stage estimation subphase (205) and (iiib) a second stage estimation subphase (206) wherein the subphase (205) comprises a step (207) of training a neural network (107) with the data from the pre-processing phase (203), and step (207) is followed by a step (208) of extraction of latent features in the next to the last layer of said neural network (107) where the dimensionality of the network (107) is reduced and the latent features of the image (102) are extracted, after which estimation takes place in step (209) where low-dynamic soil parameters (112) are forwarded to the output in phase (210), and after extraction of latent features in said step (208), latent features are forwarded for further training in substage (206) of second stage estimation and finally estimated high dynamic parameters (113) pass to the output in the output phase (212).

In a further aspect disclosed herein is a method for estimating dynamic soil parameters comprising: (i) a phase of loading input data, comprising a step of loading multispectral or hyperspectral image and a step of loading geocoordinates and terrain elevation, (ii) a phase of pre-processing of multispectral or hyperspectral image, (iii) a soil parameter estimation phase, and finally (iv) two soil output data acquisition phases. The estimation phase comprises (iiia) a first stage estimation subphase and (iiib) a second stage estimation subphase. The first stage subphase comprises a step of training a neural network with the data from the pre-processing phase, and after that a step of extraction of latent features in the next to the last layer of said neural network where the dimensionality of the network is reduced and the latent features of the image are extracted, after which estimation takes place in step where low-dynamic soil parameters are forwarded to the output in phase, and after extraction of latent features in said step, latent features are forwarded for further training in substage of second stage estimation and finally estimated high dynamic parameters pass to the output in the output phase.

In a further aspect disclosed herein is a machine-learning model comprising the system described herein for estimating dynamic soil parameters, in particular for use in the methods described herein.

In a further aspect disclosed herein is a computer-implemented method of training a machine-learning model for estimating dynamic soil parameters, in particular the machine-learning model described herein, comprising: (i) providing geolocations data, terrain elevation data and multispectral or hyperspectral image data for soils having known dynamic soil parameters, and (ii) training the system described herein with the data allowing the machine-learning model to learn and correlate the said data with dynamic soil parameters and to estimate dynamic soil parameters for soils from geolocations data, terrain elevation data and multispectral or hyperspectral image data of soils having unknown dynamic soil parameters.

In a final aspect disclosed herein is a computer-implemented method for generating a training dataset for a machine-learning model, in particular the machine-learning model comprising recording geolocations data, terrain elevation data and multispectral or hyperspectral image data for soils having known dynamic soil parameters.

DISCLOSURE OF THE INVENTION

Regenerative agriculture deals, among other things, with the distribution of organic matter in a territory, especially organic carbon in the soil, the map of spatial distribution, storage and the impact of such a procedure on the climate and the ecosystem in general.

In order to adequately perform the analyzes necessary for the assessment of organic matter, factors such as terrain and climate were considered earlier, then historical data related to land, while today it is used more the monitoring of the territory of arable land and forests, wetlands, pastures, areas along rivers, etc. using satellites, drones and such a specific way of data collecting and processing the method and system of software components of the invention proposes.

In addition to known coordinates and soil elevation, the data are obtained as multispectral or hyperspectral satellites, including but not limited to Landsat 8 and Sentinel-2 images, and the ultimate goal of their specific and new processing is to map high and low dynamic soil parameters, especially organic carbon.

The invention proposes a system and method for detecting soil parameters based on multispectral or hyperspectral images, taken by satellite cameras or cameras from a drone.

Organic matter is important because it is a way to store the surplus carbon that would otherwise be found in the atmosphere and lead to global warming. Organic carbon as such is a highly dynamic parameter while parameters such as soil texture are: sand, clay and silt content, low-dynamic parameters. At the output, the system provides both types of parameters. As we have already said at the input, the data are related to the geo coordinates of the location, the elevation of the location and the multispectral or hyperspectral images.

The estimation system, when it receives them, forwards the input data to the first- and second-level estimators, which are based on machine learning. These both estimators are parts of two-stage architecture that the system and method of the invention propose. Two-stage architecture of the estimation system is necessary to effectively combine a variety of modern machine learning methods and to use currently available data of soil parameters, which are needed to train estimators. This cannot be done with one stage architecture, because such a system necessarily relies on only one type of machine learning. The first stage estimator is a high complexity neural network, with a large number of parameters (deep neural network), for who's training a relatively large amount of data is required. The second stage estimator can be any "classical machine learning algorithm" (the invention uses Extremely Randomized Trees, although some other learning algorithms may be included), which requires relatively little amount of data for training.

Besides the two-stage system architecture, the invention introduces a new software component (phase, step of method), a module for the reduction and extraction of latent features (a fully connected layer) in order to efficiently connect a first stage estimator and second stage estimator. This module is located in the first stage estimator and it receives data from the above mentioned neural network which is also part of the first stage estimator. This module processes mentioned data and one part of data forwards to the module for estimation of low-dynamic parameters and they become the output of the first stage estimator, and the other part of the data (latent features) are used as the input of the second stage estimator which then process these latent features and at the output gives highly dynamic data, such as the content of organic carbon in the soil.

In some embodiments in the system described herein the input data (100) is geocoordinate data, the input data (101) is terrain elevation data, and the input data (102) is multispectral or hyperspectral image data optionally obtained from satellite or drone.

In further embodiments the system (105) has a multi-stage architecture combining one or more machine learning algorithms with image input data (102/104) training said estimators (106, 110). Said multi-stage architecture suitably comprises a first-degree estimator module (106) and an n'th degree estimator module (111), wherein if n=3, the 3rd degree estimator module is configured to process the low-dynamic soil parameters (112) of the soil texture with greater accuracy than the 1st degree estimator module (106).

In some embodiments the image pre-processing module (103) is configured for one or more steps of selecting images (102), reduction of cloudiness from images, defining image regions of interest, and normalizing pixel values to adjust input data for the neural network (107).

In some embodiments the neural network (107) is a deep neural network that is complex and is configured to and capable of being trained with image data (102/104).

The second stage estimator module (110) is suitably a machine learning algorithm that is trained with data forwarded by submodule (108). Additionally, or alternatively the second stage estimator module (110) receives input data (100) of the location geocoordinates and input data (101) of the terrain elevation, and output data from the submodule (108) for reduction and extraction of latent features.

The low-dynamic soil parameter (112) is particularly one or more soil properties selected from sand, clay and silt content, while the highly dynamic parameters (113) are particularly one or more soil properties selected from soil moisture, nutrient content for plants and organic carbon content in the soil.

In some embodiments first stage estimator module (106) and the second stage estimator module (110) are independently trained and wherein the deep neural network (107) is trained with cover class data. Cover class data is a concept known in the art and includes image data of objects/structures located on the ground, while usually not taking into account subterrain objects located below the ground. Cover classes refer to the land itself where different land types are organized into classes. Example of classes are land types such as vegetation, rivers, urban lands, cultivated lands, roads, mountains etc. Different soils can also be divided into different cover classes based for example on structure, texture carbon contents or other parameters. Soil structure refers to the size, shape and manner of interconnection of individual particles in the soil for example gravel, sand, dust and clay, while soil texture refers to the dimensions of such particles. Using carbon content as a class there are usually several classes, such as very low <1.0%; low: 1.01-2.0%; medium: 2.01-6.0% and high: >6.0%.

In some embodiments the first stage estimator module (106) and the second stage estimator module (110) are trained with one or more cover class data selected from forest cover and grassland cover and crops cover.

Described herein is also an estimation method for estimating dynamic soil parameters, comprising training the system of claims 1 to 12 with geocoordinate data 100, terrain elevation data 101, and multispectral or hyperspectral image data 102/104 for one or more soils of known dynamic soil parameters and subsequently submitting geocoordinate data 100, terrain elevation data 101, and multispectral or hyperspectral image data 102/104 for a soil of unknown dynamic soil parameters to the system and allowing the system to estimate the dynamic soil parameters.

Described herein is also an estimation method for estimating dynamic soil parameters comprising (i) a phase 200 of loading input data, comprising a step 201 of loading multispectral or hyperspectral image 102/104 and a step 202 of loading geocoordinates 100 and terrain elevation 101, (ii) a phase 203 of pre-processing of multispectral or hyperspectral image (102), (iii) a soil parameter estimation phase 204, and finally (iv) soil output data acquisition phases 210 and 212, wherein the estimation phase (204) comprise (iiia) a first stage estimation subphase (205) and (iiib) a second stage estimation subphase (206) wherein the subphase (205) comprises a step (207) of training a neural network (107) with the data from the pre-processing phase (203), and step (207) is followed by a step (208) of extraction of latent features in the next to the last layer of said neural network (107) where the dimensionality of the network (107) is reduced and the latent features of the image (102) are extracted, after which estimation takes place in step (209) where low-dynamic soil parameters (112) are forwarded to the output in phase (210), and after extraction of latent features in said step (208), latent features are forwarded for further training in substage (206) of second stage estimation and finally estimated high dynamic parameters (113) pass to the output in the output phase (212).

In some embodiments of the estimation method the phase (204) of the estimation comprise multiple steps in order to combine machine learning algorithms with multispectral or hyperspectral image data (102/104) on land required for sub-phase training (205 and 206).

In other embodiments the estimation phase (201) has n estimation subphases (211), wherein if n=3 the 3rd stage estimation process of low-dynamic soil parameters (112) of soil texture has greater accuracy than the first stage estimation in subphase (205).

In further embodiments the image pre-processing phase (203) comprises selection of images (103), reduction of cloudiness from images, definition of regions of interest, and normalization of pixel values to adjust input data for the neural network (107) in subphase (205).

In still further embodiments the neural network (107) in step (207) is trained with image data (102/104).

The second stage estimation in sub-phase (206) is in some embodiments a machine learning algorithm trained with data forwarded from a step (208) for reduction and extraction of latent features. Machine learning and machine learning algorithms are well known in the art. The second stage estimation sub-phase (206) may receive geocoordinate data (100), terrain elevation data (101), and output data from step (208) for reductions and extractions of latent features.

In some embodiments the low-dynamic parameter (112) in the output phase (210) is one or more soil properties selected from sand, clay and silt content. The highly dynamic parameters (113) in the output phase (212) can be one or more soil properties selected from soil moisture, nutrient content, and soil organic carbon content.

The training in the estimation phase (205) and the estimation phase (206) can be performed independently and the deep neural network (107) can be trained with cover class data. In some embodiments the training in phases (205, 206) comprises training with one or more cover class data selected from forest cover, grasslands cover and crops cover.

Also described herein is a machine-learning model for estimating dynamic soil parameters said model comprising the system described herein for use in the method described herein. This machine learning model can be trained in a computer-implemented method to estimate dynamic soil parameters, said method comprising: (i) providing geolocation data, terrain elevation data and multispectral or hyperspectral image data for soils having known dynamic soil parameters, and (ii) training the system described herein with the data allowing the machine-learning model to learn and correlate the said data with dynamic soil parameters and to estimate dynamic soil parameters for soils from geolocation data, terrain elevation data and multispectral or hyperspectral image data of soils having unknown dynamic soil parameters. Also described herein is a computer-implemented method for generating a training dataset for a machine-learning model, in particular the machine-learning model described herein comprising recording geolocation data, terrain elevation data and multispectral or hyperspectral image data for soils having known dynamic soil parameters.

Figure 1A:
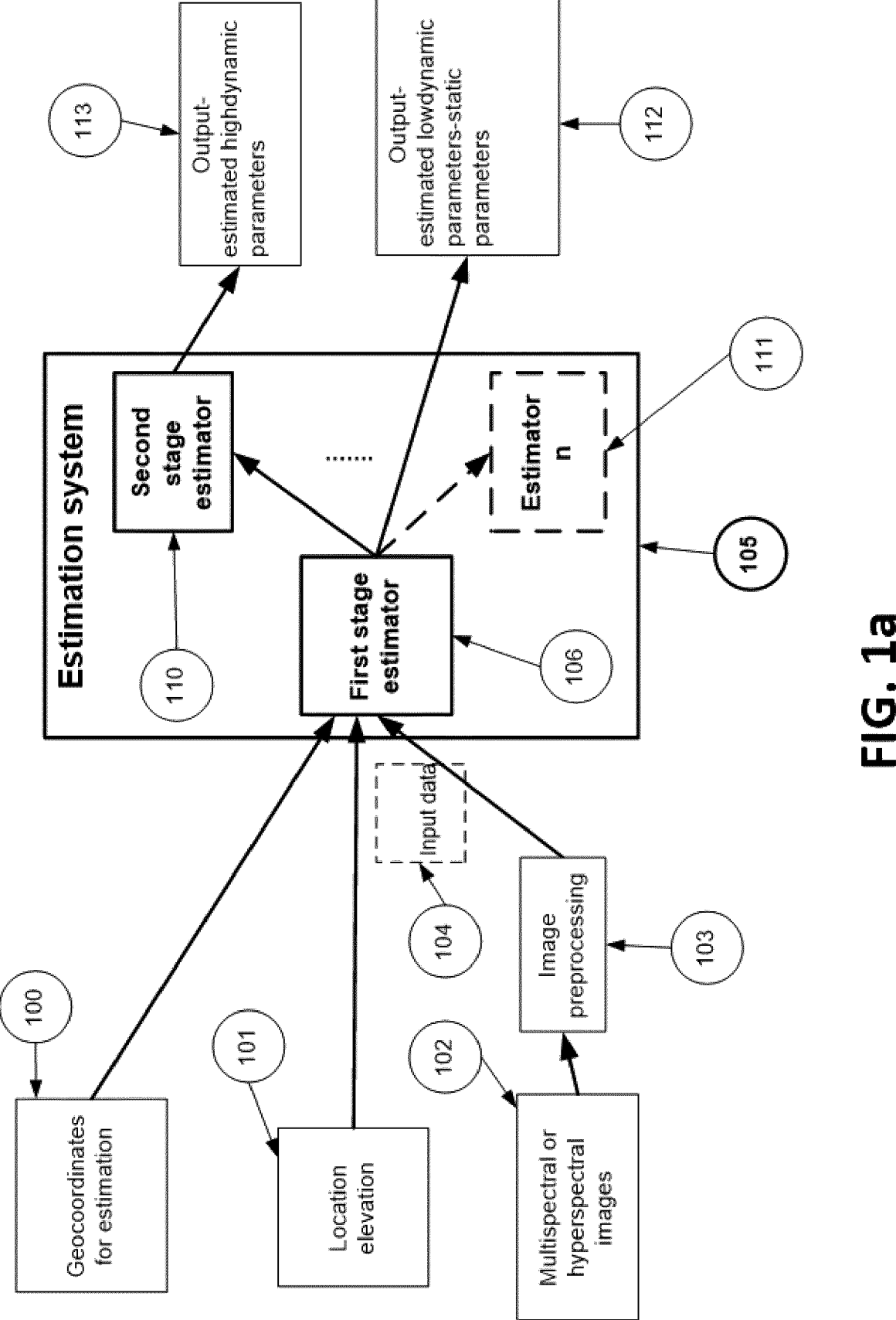
FIG. 1a is a block diagram of an invention system

Agricultural soils in the EU contain about 14 billion tons of carbon in the surface layer of the country, which is significantly more than 4.4 billion tons of greenhouse gases emitted annually by all 27 EU countries. At the same time, this storage of carbon results in the renewal of organic matter in the soils of arable land, a regenerative gift that can biologically increase soil fertility. And as a regenerative practice, "carbon farming" is included among the main parameters of the eco-scheme, the EU's agricultural policy after 2020.

Also, statistic shows that 45% of European soils have low or very low organic carbon content, 74% of soils in Southern Europe have less than 2% organic carbon content in the surface layer, and in the Republic of Serbia the largest number of samples (53.14%) within Fertility control has a low organic carbon content.

Besides the global impact on climate change, organic matter, i.e. analyses related to it are observed from the point of view that the seed grows better if there is organic matter, then the yield is higher, less fertilization is needed, there are fewer plant diseases, etc. If you look at the whole ecosystem, there is 4.2 times more carbon in the soil than in the atmosphere. Therefore, the calculations of changes in the carbon content in the soil are significant due to the emission of greenhouse gases. Forest ecosystems contain more carbon per unit area than other soil types, about 40% of the total carbon, so they are of great importance in the whole ecosystem. Forests both emit and accumulate carbon, and carbon fluxes are exposed to specific daily, seasonal, and annual dynamics. However, for one territory, region long-term carbon changes are monitored.

In addition to forests, agriculture has great potential to reduce the carbon content of the atmosphere, if we have a cheap and fast way to determine the organic carbon content of the soil for a large number of arable lands. That problem is the primary problem that invention tries to solve.

Based on all the above, there is a clear need and tendency to work on creating innovative solutions in the field of regenerative agriculture. The invention in regenerative agriculture should include various predictions and assistance in the form of software, new systems offered to farmers, scientists and the general population to more effectively monitor soil organic carbon content, global warming and the state of ecosystems in general.

The invention deals with the processing of information generated at a given moment related to said organic carbon in particular, images, and historical data related to that land. Images are obtained using satellites and drones, and then, based on a large number of algorithms; values and conclusions are processed and derived in order to make the best use of that information. Of course, they are always accompanied by the stated historical data that are inserted into the software and an attempt is made to create a mix of everything to get to the option in the software, e.g. to click for a given region and get the concentration of organic matter in that territory, e.g. carbon.

The solution of the invention offers a system and method that is universal, meaning that it can be applied to various regions and ecosystems, arable land, forests, river areas, pastures; then solution to be able to get data that are known e.g. geo coordinates and soil elevation, and then to include more data that are images from satellites or drones, and then to include neural networks and machine learning, and finally for a given region to conditionally click option in the software to get the parameters needed by the farmer, experts dealing with ecosystems, climate change, atmosphere and the like.

For the invention itself, the input is multispectral and hyperspectral images obtained from drones or satellites. Hyperspectral images are images obtained including a wider spectrum of electromagnetic radiation and then if the human eye sees only color, with a hyperspectral approach it will also see different shades of color. Hyperspectral imaging, in addition to the visible part of the spectrum, also registers the ultraviolet and infrared regions of electromagnetic radiation.

When describing the difference between hyperspectral and multispectral imaging then it is said that this difference is in the number of spectral channels. Multispectral data contains tens to hundreds of channels, while hyperspectral data contains hundreds and thousands of channels. However, there is another difference, hyperspectral data are obtained as boundary channels from a single sensor while multispectral data are a set of optimally selected spectral channels, which are usually not boundary, and can, originate from a number of sensors.

Multispectral or hyperspectral images after the pre-processing phase are taken over by the neural network. The neural network is used when data are processed in parallel, and the rules according to which are linked input and output data from the desired system are not well known, and that is the case we have here with the invention. In general, neural networks are a form of implementation of artificial intelligence systems and as such represent a software system where the data processing units of which they consist are in fact an analogy with neurons in the brain and these units process numerical data and units are connected.

The connection of the units reflects the weight factor. The way of connecting these units makes the architecture, the number of layers structure a neural network. The number of layers varies, the first is input, the last output, and the rest in between depends on the application, data type, etc. One such network operates in an invention system and it is part of a software module called a first stage estimator (by analogy with the method, this module is a subphase of estimation). He will submit the data to the second stage estimator, and together they will provide data that are highly and low dynamic data related to the land being analyzed. These two levels of architecture and the connection between these two modules are the basic innovation and the subject of the invention.

It is characteristic of neural networks to be trained. The innovative neural network training is described in FIG. 1b below. Network training consists of matching inputs and outputs, i.e. we give something at the entrance and try to get the output we need, and if the network makes a mistake, then its weighting coefficients must be changed and it takes time to achieve the desired output through training.

As the invention also uses machine learning algorithms, it also belongs to the subfield of artificial intelligence whose goal is to construct algorithms and computer systems that are capable of adapting to analog new situations and learning based on experience. We need that in agriculture and soil analysis of ecosystems because when we find it we have that experiential part related to a climate and how plants behave, and we also have new situations, varieties, then climate change, then soil composition change depending on a number of factors and finally everything needs to be done by estimating the important parameters.

What is important for the system and method of invention is to observe the content of organic matter in the soil over time, which will then help farmers and scientists to monitor future changes in soil functions and the ecosystem in general.

FIG. 1a shows the low and high dynamic output parameters of the soil, but with special emphasis on the high dynamic parameter, the organic carbon content in the soil. What is seen in soil as an indicator of quality is the carbon content in the surface layer. It is a part of organic matter and its quantity varies depending on the type of soil, depth, etc. The invention looks at the depth of the surface layer up to 30 cm.

Figure 1B:
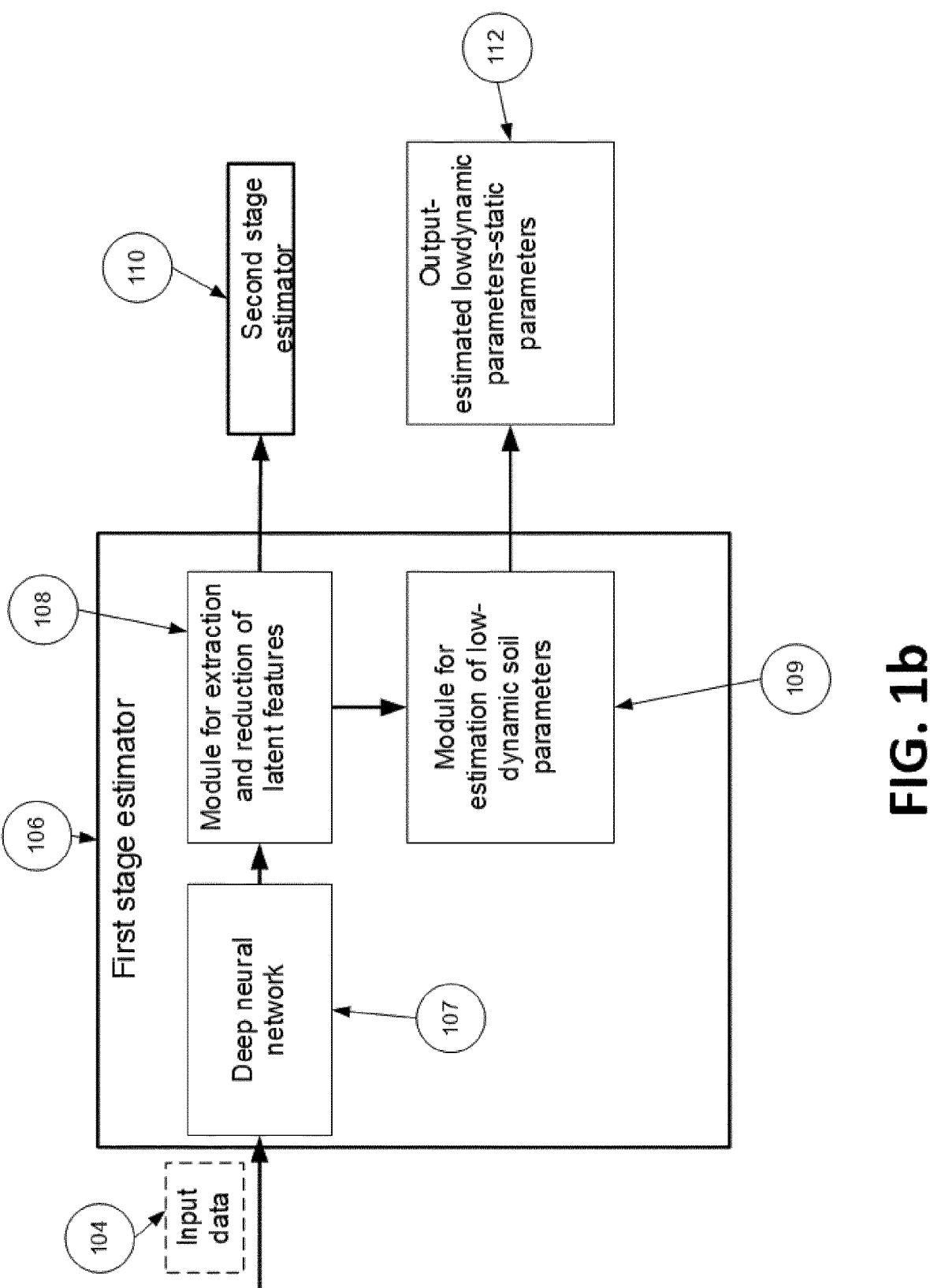
FIG. 1b is architecture of first stage estimator

FIGS. 1a and 1b show a system of software components of the invention for detecting soil parameters based on multispectral or hyperspectral images, taken by satellite cameras or cameras from a drone.

The invention proposes an estimation system 105 with two-stage architecture consisting of first stage estimator module 106 which is a software component (module) and second stage estimator module 110 which is also a software component (module). The invention also includes by analogy with second stage estimator and the estimator module 111 of the nth stage of architecture and for the case when n=3 this module of the 3rd stage estimator would do a better, additional and more accurate assessment of soil texture than first stage estimator module 106. In this case, the invention proposes multi-stage system architecture.

Estimators 106 and 110, first and second stage of estimation, are based on machine learning. The proposed two-stage or multi-stage architecture of system 105 for estimation is suitable because it combines machine learning algorithms with currently available land data that are necessary to train mentioned estimators. This cannot be done with single-stage architecture, because such a system necessarily relies on only one type of machine learning.

At the input, the first stage estimator module 106 receives data in the form of a multispectral or hyperspectral image 102 which then passes through the image pre-processing module 103 which then gives prepared data 104 for the neural network 107 of first stage estimator module 106.

Multispectral satellite images 102 are images from Landsat 8 and Sentinel 2 satellites, but it is not a limitation. Sentinel 2 images have 13 channels. Landsat 8 has 12 channels. What the invention does when it comes to Landsat 8 images, is do a linear transformation over them to reduce Landsat channels to Sentinel 2 channels, add one constant channel and then further treat those images as Sentinel 2 images in the models of the invention. Of course, with Sentinel 2 satellites, this type of pre-processing is not required.

The invention of said image 102 is downloaded from the web server, then they are pre-processed and a database is formed.

Within the pre-processing 103 of images 102, a selection of satellite images 102 is performed, where scenes in the image are selected depending on some parameter, e.g. date and cloud threshold e.g. to be less than 10%. Further, the region of interest from the scene is defined; the part around a point, e.g. looking at a part of 64×64 pixels and that is the region of interest. After that, the normalization of the pixel value takes place due to the adjustment of the input data for the neural network 107 of the first stage estimator module 106.

The first stage estimator 106 consists of a neural network 107 of high complexity, with a large number of parameters (deep neural network), for the training of which a relatively large amount of data is required.

In addition to the deep neural network 107, the first stage estimator 106 also contains an innovative component of the invention, submodule 108 for reducing and extracting latent features (fully connected layer) and submodule 109 for estimating low-dynamic parameters, as shown in FIG. 1*b*.

Submodule 108 is introduced to provide an efficient coupling between estimators 106 and 110, 1st and 2nd degree and represents, in addition to the two-stage architecture, the main innovative feature of the invention.

Submodule 108 is in fact the next to the last layer of said network 107 which has the property of reducing the dimensions of the network, e.g. if there is a 64×64 pixel image at the input to the network and 1920 values of the multispectral image would be obtained as the output from the network, submodule 108, i.e. the next to the last layer will reduce the dimensionality of the network to obtain 128 values (range 32 to 520) of essential multispectral parameters of the image 102 which forwards the submodule 109 to estimate the low-dynamic parameters 112 of the soil and to pass them as latent features at the input of the second stage estimator module 110. The first stage estimator 106 sees the image 102 at the input, while the second stage estimator 110 does not see the image, but its values, e.g. those 128 multispectral values provided by submodule 108.

The second stage estimator 110 can be any "classic machine learning algorithm" (e.g. Extremely Randomized Trees), for the training of which a relatively small amount of data is required, precisely those listed, e.g. 128 values. The second stage estimator 110 also obtained data 100 and 101, related to geolocations and terrain elevations, respectively, and combined them with latent features obtained from submodule 108 (those 128 multispectral image values) to estimate the output of highly dynamic soil parameters 112 (organic carbon).

Historical data of soil parameters, obtained by soil sampling and laboratory analysis exist, but since multispectral images 102 are widely available only from the launch of Landsat 8 and Sentinel 2 satellites (ie. from 2013 and 2015 respectively), for most of the historical data it is not possible to obtain combinations of data about measured value of the soil parameter and the multispectral image that reflect the situation at the same time.

The available multispectral images 102 and historical data can therefore be used exclusively for estimating parameters 112 that are relatively static (have low dynamics in time), because time correspondence is not important in this case. Such a parameter 112 is e.g. soil texture that changes on scales less than a few decades only at landslide locations, floodplains and the like, but is static for most of the soil.

For highly dynamic parameters 113 such as soil moisture, nutrient content and organic carbon content, which vary significantly on a daily to annual scale, images must be taken within the time interval around the time in which the soil sample was taken and laboratory processed. There is relatively little data of experimentally determined values of soil parameters, which were created in the period for which multispectral images are widely available, and this is precisely the topic of the problem of the invention.

The proposed approach is designed to make optimal use of available data of land parameters. The first stage estimator 106 uses a complex algorithm that enables modeling of complex relationships in a large data set and estimates the low-dynamic parameter 112 (soil texture, for example). The second stage estimator 110 uses an algorithm suitable for a smaller amount of data and it is used to estimate the highly dynamic parameter 113 (e.g. soil carbon content), which is the ultimate goal of the invention. The standard deep neural network 107 is usually pre-trained with image data of objects located on the ground (cover class). The cover class only takes into account objects located on the ground, not below. Typically, the texture and organic carbon data can be retrieved of down up to 30 cm deep.

When training models, a cover class model is usually used to create estimators 106 and 110 for individual classes of interest. For now, the invention is limited to an estimator for forests and an estimator for a set of grasslands and crops, but it is planned to create a separate estimator for each type of crop in the future.

Figure 2:
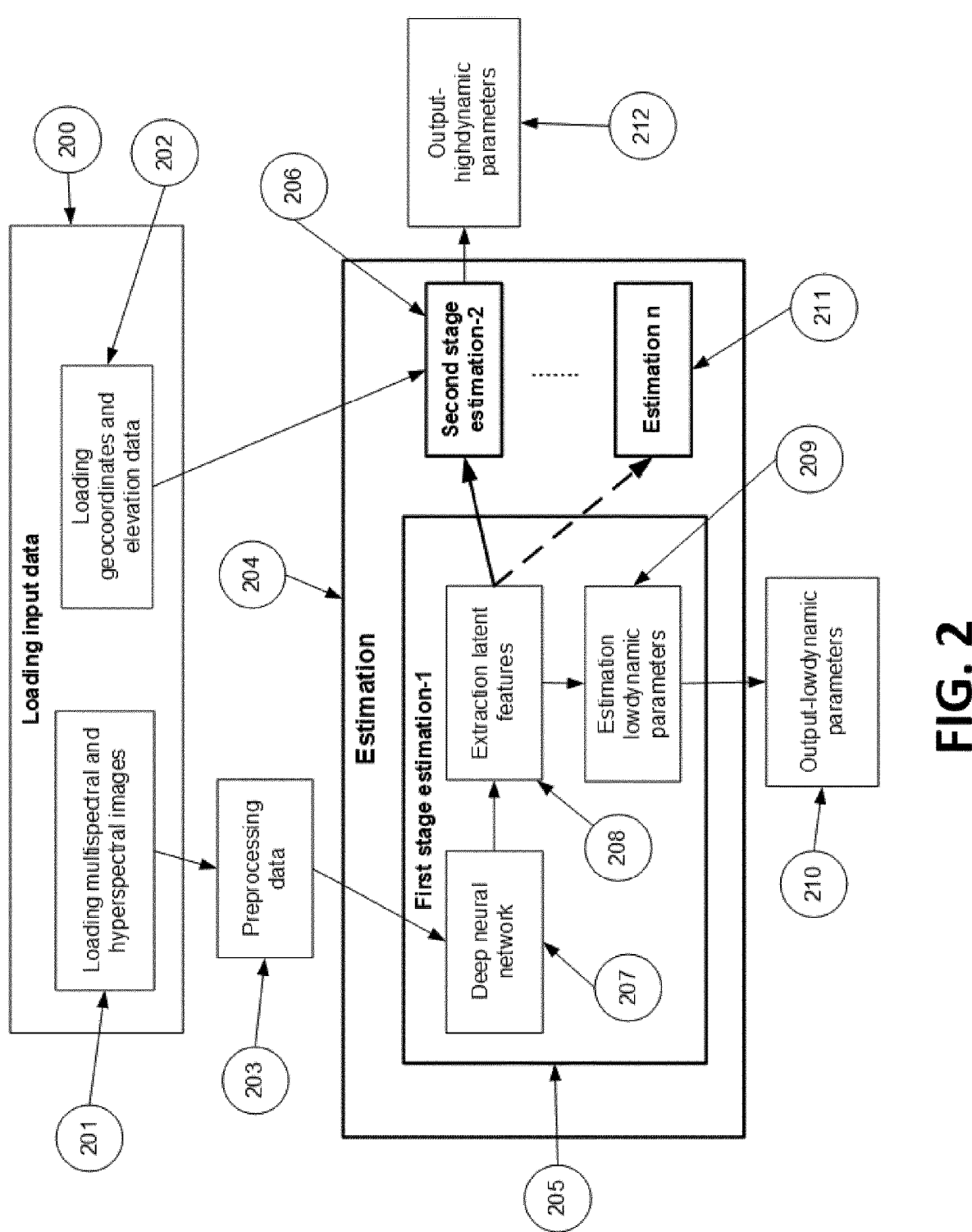
FIG. 2 shows the stages of the methods of the invention

FIG. 2 describes a method of invention by analogy with a system of software components of the invention. The method consists the phase 200 of loading input data with step 201 of loading multispectral or hyperspectral images 102 and phase 202 of loading the geocoordinates 100 of the location and the elevation 101 of the land; then multispectral or hyperspectral images are preprocessed in phase 203, then it is going on an estimation phase 204, and finally in phases 211 and 212 are given output data.

In phase 211, the low-dynamic parameters 112 were estimated at the output, while in phase 212, the highly dynamic parameters 113 of the soil were estimated.

The estimation phase 204 contains subphase 205 of first stage estimation where the deep neural network training step 207 takes place with the data from the pre-processing phase 203 and after step 207 the neural network output data is forwarded to the next step 208 where the latent features are extracted (mentioned 128 values of the input multispectral image) and then it is going the step 209 estimation of latent features (soil texture) and output phase 211, and also from step 208 extraction of latent features (again 128 values as a vector), sub-phase 206 of second stage of estimation takes place and finally in phase 213 highly dynamic soil parameters are given as an output (organic carbon). If there are more than 2 stages of estimation in phase 204, then we have a multistage architecture supported by the invention and the nth phase 211 of estimation. As stated above for n=3, there is a third stage of estimation which gives the estimation with higher accuracy then it is given in phase 205 with the first stage of estimation.

The main innovation of the method of the invention is the realization of phase 204 of estimation which is realized from two subphases 205 and 206, first and second stage of estimation, which due to the above-mentioned problem are connected by subphase 208 of latent feature extraction. Also, the multi-stage realization of the estimation phases is an innovative feature of the invention.

Subphase 208 is implemented as the penultimate layer in said neural network 107 and has the role of reducing the dimensionality of the network 107 by outputting a vector quantity that includes a range of 32 to 512 values for the input multispectral image 102. Specific current implementation says that said vector has 128 values, but some further embodiments of the invention may include modifications from this range of number values.

Items

Further described herein are the following itemized embodiments:

Item 1: The system and method for estimating dynamic soil parameters based on multispectral or hyperspectral images, where said system receives input data 100, 101 and 102 from a database, then the system pre-processes data 102 in module 103 for pre-processing and forwards data 100,101,102 to the input of the estimation system 105 which processes them and forwards them to the output, wherein that said estimation system (105) comprises a first stage estimator module (106) and a second stage estimator module (110), and first stage estimator module (106) comprises a neural network (107), a reduction submodule (108) which extracts latent features and submodule (109) for estimating the low-dynamic parameters (111), and said network (107) is trained with the data (104) received from the pre-processing module (103) and in the next to the last layer of the neural network (107) submodule (108) reduces the dimensionality of the network (107) and extracts the latent features that are passed to the submodule (109) for estimating low-dynamic parameters (111) which than forwards them to the output, and the latent features are also passed to the second stage module estimator (110) which is further trained with the indicated latent features and input data (100, 101) and forwards the estimated highly dynamic parameters (113) to the output, where said submodule (108) for reduction and extraction of latent features is a fully connected layer which connects first stage estimator module (106) and second stage estimator module (110).

Item 2: The system according to item 1, wherein the input data (100) is geocoordinate data, the input data (101) is land elevation data, and the input data (102) is multispectral or hyperspectral images obtained from satellite or drone.

Item 3. The system according to item 1, wherein said system (105) has a multi-stage architecture because it combines machine learning algorithms with the currently available image input data (102) necessary to train said estimators (106,110).

Item 4. The system according to item 1, wherein said system (105) has a multi-stage architecture comprising a 1st degree estimator module (106) and an nth degree estimator module (111), wherein if n=3, the 3rd degree estimator module processes the low-dynamic parameters (112) of the soil texture with greater accuracy in relation to the 1st degree estimator module (106).

Item 5. The system according to item 1, wherein the image pre-processing module (103) selects said images (102), filters them for cloudiness, defines a region of interest, and normalizes pixel values to adjust the input data for the neural network (107).

Item 6. The system according to item 1, wherein the neural network (107) contained in the first stage estimator module (106) is deep neural network that is complex and is trained with a large amount of image data (102).

Item 7. The system according to item 1, wherein the second stage estimator module (110) is a classical machine learning algorithm that is trained with a small amount of data forwarded by submodule (108).

Item 8. The system according to item 1, wherein the second stage estimator module (110) receives input data (100) of the location geocoordinates and input data (101) of the terrain elevation, and output data from the submodule (108) for reduction and extraction of latent features.

Item 9. The system according to item 1, wherein the low-static parameter (112) is the texture of the soil: sand, clay and silt content; which is time-static and changes on scales of less than a few decades only at landslide locations and floodplains.

Item 10. The system according to item 1, wherein the highly dynamic parameters (113) are soil moisture, nutrient content and organic carbon content in the soil.

Item 11. The system according to item 1, wherein the training of the first stage estimator module (106) and the second stage estimator module (110) take place independently wherein the deep neural network (107) is trained with the available class data objects located on the ground.

Item 12. The system according to items 1 and 11, wherein the training of the first stage estimator module (106) and the second stage estimator module (110) are trained for classes of forest cover and grassland and crops.

Item 13. A method for estimating dynamic soil parameters based on multispectral or hyperspectral images consisting of phase 200 of loading input data with step 201 of loading multispectral or hyperspectral image 102 and step 202 of loading geocoordinates 100 and terrain elevation 101, then phase 203 of image 102 pre-processing, the soil parameter estimation phase 204, and finally the soil output data acquisition phases 210 and 212, wherein the estimation phase (204) consists of a first stage estimation subphase (205) and second stage estimation subphase (206) wherein the subphase (205) comprises a step (207) of training a neural network (107) which is trained with the data from the pre-processing phase (203), and step (207) is followed by step (208) of extraction of latent features in the next to the last layer of said neural network (107) where the dimensionality of the network (107) is reduced and the latent features of the image (102) are extracted, after which estimation takes place in step (209) where low-dynamic soil parameters (112) are forwarded to the output in phase (210), and after extraction of latent features in said step (208), latent features are forwarded for further training in substage (206) of second stage estimation and finally estimated high dynamic parameters (113) pass to the output in the output phase (212).

Item 14. The method of item 13, wherein said phase (204) of the estimation is multi-step in order to combine machine learning algorithms with currently available input data (102) on land required for sub-phase training (205 and 206).

Item 15. The method according to item 13, wherein said estimation phase (201) has n estimation subphases (211), wherein if n=3 there is 3rd stage estimation processes of low-dynamic parameters (111) of soil texture with higher accuracy than it will be done with first stage estimation in subphase (205).

Item 16. The method of item 13, wherein the image pre-processing phase (203) selects images (103), filters them for cloudiness, defines a region of interest, and normalizes pixel values to adjust neural network input data in subphase (205).

Item 17. The method of item 13, wherein the neural network (107) in step (207) is a deep neural network that is complex and is trained with a large amount of image data (102).

Item 18. The method according to item 13, wherein the second stage estimation in sub-phase (206) is classical machine learning algorithm which is used to train a small amount of data forwarded from a step (208) for reduction and extraction of latent features.

Item 19. The method of item 13, wherein the second stage estimation sub-phase (206) at the input obtains input data (100) of the location geocoordinate and input data (101) of terrain elevation, and output data from step (208) reductions and extractions of latent features.

Item 20. Method according to item 13, wherein the low-static parameter (112) in the output phase (210) is the texture of the soil: sand, clay and sludge content; which is time-static and changes on scales of less than a few decades only at landslide locations and floodplains.

Item 21. The method of item 13, wherein the highly dynamic parameters (113) in the output phase (212) are: soil moisture, nutrient content, and soil organic carbon content.

Item 22. The method of item 13, wherein the training in the estimation phase (205) and the estimation phase (206) is performed independently wherein the deep neural network (107) is trained with available data on the classes of objects located in the country.

Item 23. The method according to items 13 and 22, wherein the training in phases (205, 206) takes place for classes of forest cover, grasslands and crops.

WORKING EXAMPLE

Figure 3:
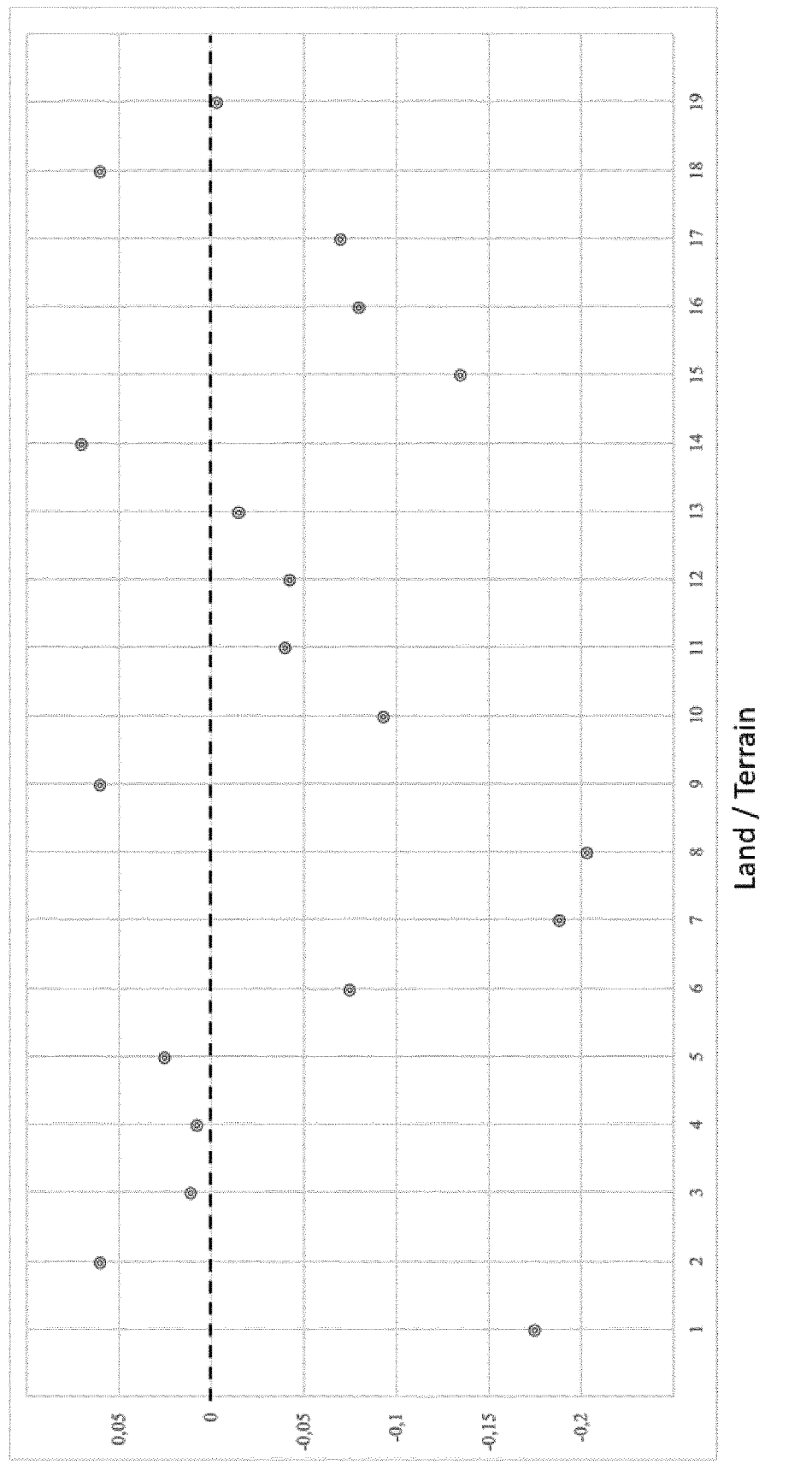
FIG. 3 shows the results in estimation of organic carbon with an invention system Before Regenerative agriculture deals with the so-called carbon farming which as a term represents a set of agricultural practices that result in increased storage of atmospheric carbon in the soil. This carbon storage is the key measure in mitigating climate change. EU legislators have a positive view of the potential of the so-called carbon sequestration as the EU strives to be climate neutral by 2050. To do this, the EU Commission has proposed the measures to reduce carbon emissions from 40% to 55% until 2030. Crops are natural carbon sinks, removing the equivalent of about 51 billion tons of carbon dioxide from the atmosphere each year and storing them in the surface layer of the earth.

In one example, the first stage estimator (106) was trained first with multispectral images obtained from the Sentinel 2 satellite mission, for 27,000 geographical locations where the exact land cover is known, and where the goal of the estimator is to recognize one of 10 predefined classes of land cover. The training was conducted for 80 epochs. After that the estimator (106) was trained to estimate the content of silt and sand in the soil for 13,000 locations where these parameters are known, using multispectral images obtained from the Landsat 8 satellite mission. The training was done for 3,000 epochs. After that, the estimator was used to extract the features (using step 208) from Landsat 8 imagery for environ 6,500 locations located mostly in North America where the soil organic carbon content was known. These features, along with the geocoordinates of elevation of each of these locations and the known value of soil organic carbon were then used to train the second stage estimator (206). The best hyper parameters of estimator 206 were determined by testing 120,000 different combinations. Once both estimators were trained, Landsat 8 images were obtained for 269 test locations, located in 19 different agricultural fields for which soil organic carbon was known, but which were not used in the training of any of the estimators. FIG. 3 shows the average error in percent of soil organic carbon for each of the 19 fields. The x-axis indicates different fields, and the y axis indicates the error/deviation of the estimation from the known statistical parameter value for the given field. These results revealed an excellent estimation using the system and method described herein In a further example, the first stage estimator (106) trained in the previous example was reused and used to extract features from Landsat 8 satellite images of 55,000 locations in Northern Italy, for which the land texture parameters (content of sand and clay in the soil) were known. These features, geocoordinates and elevation of the locations, as well as known sand content values were then used to train a second stage estimator 110 in phase 211 to estimate sand content, and another second stage estimator 110 was trained in phase 211 to estimate the clay content. The best configuration of the estimators was then determined by testing 12.440 different values for the estimator hyper parameters. Using 10-fold cross validation for determining estimator performance, the estimates of sand content had a mean absolute error of 7.2%, while estimates of clay content had an error of 5.8%.

In a still further example, the first stage estimator 106 trained in the previous example was used directly to estimate the clay and sand content in phase 210 of the soil without additional training for locations in 9 fields in North America. Landsat 8 images for locations in 4 of these fields where the value of soil organic carbon and bulk density were known, as well as images for 12,000 other locations around the world having known soil organic content were used to train the second stage estimator 110 in phase 206 to estimate soil organic carbon content. As in the previous two examples, the first stage estimator was used to extract the (latent) features in phase 208 from satellite imagery. Once trained, the second stage estimator 110 in phase 206 was used to estimate soil organic content for 9 locations per hectare of the 9 fields, while the first stage estimator 106 was used to estimate the clay and sand content for those locations in phase 210. These data were then combined to derive bulk density and carbon stock for each of the 9 fields.

These examples show the ability and usefulness of the system and methods described herein to estimate soil parameters such as density, content of silt, sand, clay, and/or carbon from imagery.

The invention finds application in the field of regenerative agriculture and ecosystems in general.

The invention claimed is:

1. A system for estimating dynamic soil parameters, where said system comprises:

a) a pre-processing module;

b) an estimation system comprising:

i) a first stage estimator module comprising a neural network, a reduction submodule, and a submodule; and ii) a second stage estimator module;

wherein the system is configured for:

(i) receiving input data from a database;

(ii) pre-processing data in the pre-processing module to produce preprocessed data; and (iii) forwarding data to an estimation system, which processes the data and forwards them to an output, wherein a) the reduction submodule is configured for extracting one or more latent features, b) the submodule is configured for estimating one or more low-dynamic soil parameters;

c) the neural network is configured to be trained with data received from the pre-processing module and in the next to the last layer of the neural network d) the submodule is configured for reducing the dimensionality of the neural network and for extracting the one or more latent features and for passing these on to the submodule and also passed on to the second stage module estimator, e) the submodule is configured for estimating low-dynamic soil parameters, which are then forwarded to the output;

f) the second stage module estimator is configured to be trained with the latent features and input data and for estimating highly dynamic parameters for forwarding the highly dynamic parameters to the output;

wherein said submodule configured for reduction and extraction of latent features is a fully connected layer which connects the first stage estimator module and the second stage estimator module.

2. The system of claim 1, wherein the input data is geocoordinate data, the input data is terrain elevation data, and the input data is multispectral or hyperspectral image data optionally obtained from satellite or drone.

3. The system of claim 1 wherein said system has a multi-stage architecture combining one or more machine learning algorithms with image input data training said estimators.

4. The system of claim 1, wherein said system has a multi-stage architecture comprising a first-degree estimator module and an n'th degree estimator module, wherein if n=3, the 3rd degree estimator module is configured to process the low-dynamic soil parameters of the soil texture with greater accuracy than the 1st degree estimator module.

5. The system of claim 1, wherein the image pre-processing module is configured for one or more steps of selecting images, reduction of cloudiness from images, defining image regions of interest, and normalizing pixel values to adjust input data for the neural network.

6. The system of claim 1, wherein the neural network is a deep neural network that is complex and is configured to and capable of being trained with image data.

7. The system of claim 1, wherein the second stage estimator module is a machine learning algorithm that is trained with data forwarded by submodule.

8. The system of claim 1, wherein the second stage estimator module receives input data of the location geocoordinates and input data of the terrain elevation, and output data from the submodule for reduction and extraction of latent features.

9. The system of claim 1, wherein the low-dynamic soil parameter is one or more soil properties selected from sand, clay and silt content.

10. The system of claim 1, wherein the highly dynamic parameters are one or more soil properties selected from soil moisture, nutrient content for plants and organic carbon content in the soil.

11. The system of claim 1, wherein the first stage estimator module and the second stage estimator module are independently trained and wherein the deep neural network is trained with cover class data.

12. The system of claim 11, wherein the first stage estimator module and the second stage estimator module are trained with one or more cover class data selected from forest cover and grassland and crops.

13. A method for estimating dynamic soil parameters, comprising training the system of claim 1 with geocoordinate data, terrain elevation data, and multispectral or hyperspectral image data for one or more soils of known dynamic soil parameters and subsequently submitting geocoordinate data, terrain elevation data, and multispectral or hyperspectral image data for a soil of unknown dynamic soil parameters to the system and allowing the system to estimate the dynamic soil parameters.

14. A method for estimating dynamic soil parameters comprising (i) a phase of loading input data, comprising a step of loading multispectral or hyperspectral image and a step of loading geocoordinates and terrain elevation, (ii) a phase of pre-processing of multispectral or hyperspectral image, (iii) a soil parameter estimation phase, and finally (iv) soil output data acquisition phases, wherein the estimation phase comprise (iiia) a first stage estimation subphase and (iiib) a second stage estimation subphase wherein the subphase comprises a step of training a neural network with the data from the preprocessing phase, and step is followed by a step of extraction of latent features in the next to the last layer of said neural network where the dimensionality of the network is reduced and the latent features of the image are extracted, after which estimation takes place in step where low-dynamic soil parameters are forwarded to the output in phase, and after extraction of latent features in said step, latent features are forwarded for further training in substage of second stage estimation and finally estimated high dynamic parameters pass to the output in the output phase.

15. The method of claim 14, wherein said phase of estimation comprise multiple steps to combine machine learning algorithms with multispectral or hyperspectral image data on land required for sub-phase training.

16. The method of claim 14, wherein said estimation phase has n estimation subphases, wherein if n=3 the 3rd stage estimation process of low-dynamic soil parameters of soil texture has greater accuracy than the first stage estimation in subphase.

17. The method of claim 14, wherein the image pre-processing phase comprises selection of images, reduction of cloudiness from images, definition of regions of interest, and normalization of pixel values to adjust input data for the neural network in subphase.

18. The method of claim 14, wherein the neural network in step is trained with image data.

19. The method of claim 14, wherein the second stage estimation in sub-phase is a machine learning algorithm trained with data forwarded from a step for reduction and extraction of latent features.

20. The method of claim 14, wherein the second stage estimation sub-phase receives geocoordinate data, terrain elevation data, and output data from step for reductions and extractions of latent features.

* * * * *